United States Patent [19]

Netto

[11] Patent Number: 5,542,724
[45] Date of Patent: Aug. 6, 1996

[54] SEALING SYSTEM, SECURITY SEAL AND INJECTION MOULDING SYSTEM FOR MANUFACTURING A SEALING SYSTEM

[75] Inventor: Eduardo D. C. Netto, Rio de Janeiro, Brazil

[73] Assignee: ELC Produtos de Seguranca Industria e Comercio Ltda, Rio de Janeiro, Brazil

[21] Appl. No.: 307,831

[22] PCT Filed: Mar. 30, 1993

[86] PCT No.: PCT/BR93/00010

§ 371 Date: Sep. 29, 1994

§ 102(e) Date: Sep. 29, 1994

[87] PCT Pub. No.: WO93/19995

PCT Pub. Date: Oct. 14, 1993

[30] Foreign Application Priority Data

Mar. 31, 1992 [BR] Brazil ..................... 9201127

[51] Int. Cl.$^6$ .................................. B65D 27/30
[52] U.S. Cl. ..................... 292/317; 292/307 R
[58] Field of Search .............. 292/307 R, 307 B, 292/317, 318, 319, 320, 323, 329, 330, 328; 425/577, 545, 442

[56] References Cited

U.S. PATENT DOCUMENTS

| | | | |
|---|---|---|---|
| 1,866,461 | 7/1932 | Goschnick | 292/319 |
| 2,781,217 | 2/1957 | Swan | 292/322 |
| 2,913,274 | 11/1959 | Brooks et al. | 292/317 |
| 3,489,449 | 1/1970 | Lai | 292/317 |
| 3,556,575 | 1/1971 | Farkas | 292/318 X |
| 3,920,368 | 11/1975 | Levelson | 425/422 X |
| 4,330,256 | 5/1982 | Reichenbach et al. | 425/422 X |
| 4,470,173 | 9/1984 | Adamson | 292/318 X |
| 4,501,049 | 2/1985 | Adamson | 292/318 X |
| 4,676,535 | 6/1987 | Mautner | 292/320 |
| 4,731,212 | 3/1988 | Hasegawa | 425/545 X |
| 5,275,548 | 1/1994 | Tibiletti | 425/577 X |
| 5,356,284 | 10/1994 | Sheffield | 425/422 X |

FOREIGN PATENT DOCUMENTS

| | | | |
|---|---|---|---|
| 2034279 | 11/1970 | European Pat. Off. | |
| 223905 | 6/1987 | European Pat. Off. | |
| 298490 | 10/1928 | United Kingdom | 292/307 |
| 2135382 | 8/1984 | United Kingdom | |

Primary Examiner—Steven N. Meyers
Assistant Examiner—Monica E. Millner
Attorney, Agent, or Firm—Beveridge, DeGrandi, Weilacher & Young

[57] ABSTRACT

A sealing system of the type in which a locking pin is received in a cavity containing a tooth that cooperates with the pin to prevent withdrawal of the pin. The object of the invention is to provide this type of seal but which is at the same time both of high security and simple to manufacture. In the system of the invention, the cavity (2) has two openings (14, 16) adjacent to each other and separated by the base (17) of the tooth (18). The cavity is otherwise totally closed and its inner wall (21), which extends to the bottom of the cavity, is curved under the base (17) of the tooth. This permits manufacture using an injection mould having a plate (39) provided with a fixed part (40) and a part (41) rotatably mounted on the fixed part to define therebetween the male mould portion for moulding a cavity with a tooth. An actuator (42) serves to rotate the rotary part (41) during opening of the mould, the rotary part (41) having a curved surface (52) corresponding to the curved part of the inner wall (21) of the cavity. Security seals and devices incorporating the new sealing system are also described.

8 Claims, 5 Drawing Sheets

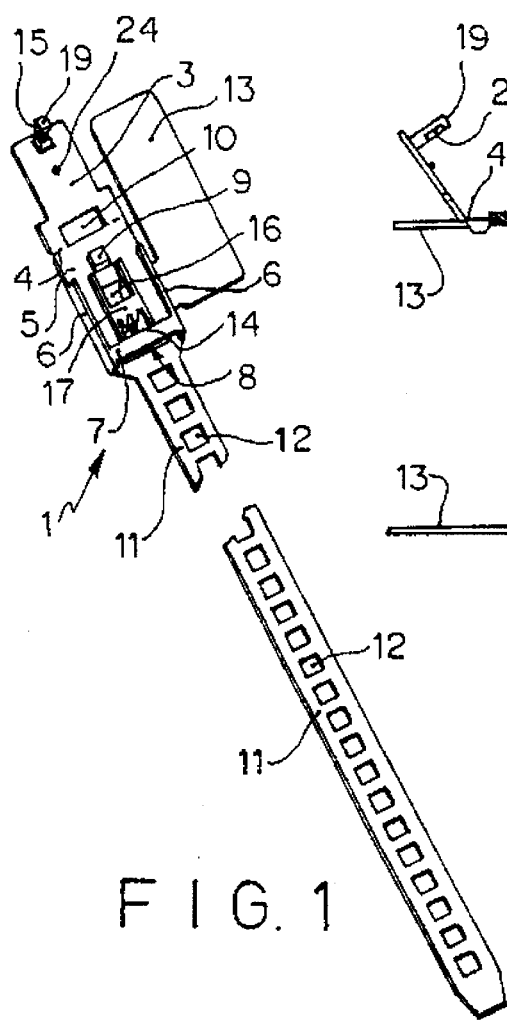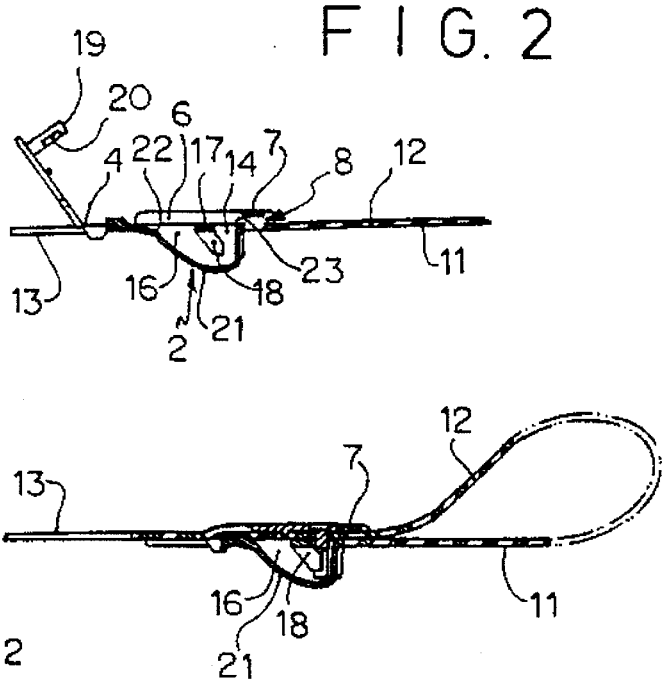
FIG. 1
FIG. 2
FIG. 3

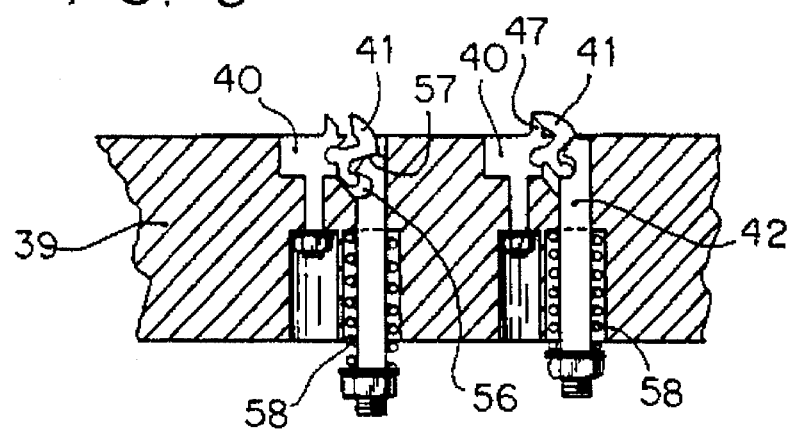
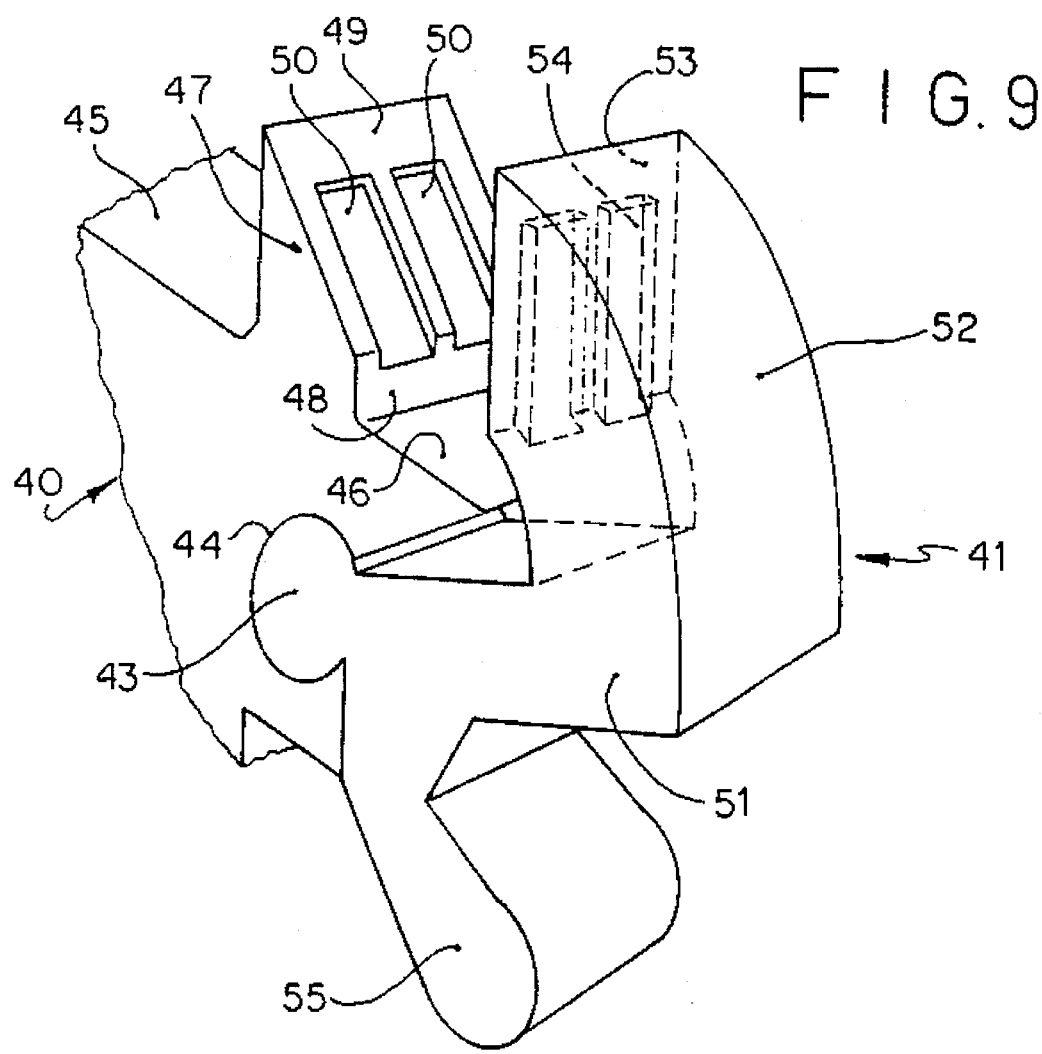

SEALING SYSTEM, SECURITY SEAL AND INJECTION MOULDING SYSTEM FOR MANUFACTURING A SEALING SYSTEM

The present invention refers to a new sealing system suitable for use in security seals and other devices designed to seal objects.

Many sealing systems are known in which a locking pin is received within a cavity or orifice having internal teeth for cooperating with and locking the pin, thus preventing relative movement between the two parts. However, many known drawbacks are associated with seals of this type, for example:

a) although their manufacture is relatively simple, those systems that use orifices passing right through the part in which they are formed have a generally reduced degree of security since access to the teeth is available from the side of the orifice opposite that which is penetrated by the locking pin;

b) attempts to increase the degree of security of systems of type a) above often fail to provide the ideal security desired and almost always increase manufacturing costs; and c) those systems in which the bottoms of the locking pin receiving cavities are closed so as to prevent access to the pins after closure are manufactured using injection moulds having complex structures subject to all types of malfunction, this also increasing the cost of the final product to an inacceptable level.

An example of a seal having a closed cavity is the plastic/metal padlock type seal of EPO-A-0 223 905. That seal comprises a plastic body formed internally with two closed cavities separated by a wall having lateral protuberances behind and below which reversely bent prongs of a metal shackle element engage for closure of the seal. Such lateral protuberances that have the function of internal locking teeth have negative surfaces facing the bottoms of the respective closed cavities. Although EPO-A-0 223 905 does not relate to, nor does it disclose, the manner of manufacturing the seal, it is clear that if injection moulding techniques are to be used, the presence of the under surfaces of the protuberance require the use of an mould having a complex structure with movable parts (wedges or the like) that have to move at the beginning and end of each injection cycle.

The purpose of the present invention is, therefore, to provide a high security sealing system that can be manufactured using an extremely simple injection mould that is not subject to malfunction.

According to the present invention, a sealing system for a security seal is of the type comprising a first part having a cavity containing a tooth and a second part carrying a locking pin which, on being inserted into the cavity through an entry opening, cooperates in locking relation with the tooth to assume a sealed configuration that prevents its removal from the cavity. There is a second entry opening to the cavity adjacent the first entry opening and the region between the two entry openings comprises a base of the tooth. The cavity is substantially closed with the exception of the two entry openings and an inner wall of the cavity—which extends from the edge of one of the said entry openings to the bottom of the cavity which is opposite the entry openings—is curved under the base of the tooth.

This novel sealing system is suitable for manufacture by injection moulding using a mould having a fixed part and a rotary part to mould the closed cavity with the inner tooth. This is possible precisely due to the novel characteristics of the sealing system, that is to say, the fact that there are two adjacent entry openings with the base of the tooth between them and that the inner wall of the cavity is curved under the base of the tooth.

With further reference to the sealing system, the tooth is preferably formed with a longitudinal slot and the locking pin has a longitudinal rib that fits into such slot in the sealed configuration.

It is also preferable that the edge of the entry opening from which the curved wall extends is the edge of the second entry that is opposite the edge adjacent the base of the tooth.

According to another aspect of the invention, a security seal comprises a sealing system as defined above, an elongate flexible strip extending from the first part and formed along its length with a series of openings longitudinally spaced from each other, and hinge means joining the second part to the first part to permit the second part to be folded over the first part to present the locking pin to the first entry opening of the cavity. Each of the openings in the strip is dimensioned to permit passage therethrough of the locking pin.

In a preferred embodiment of the seal, there are guide means in the first part for passage of the free end of the flexible strip. Furthermore, the first part may be formed with a protuberance adjacent one of the entry openings, the protuberance being dimensioned to penetrate one of the openings in the strip and being spaced from the first entry opening by a distance equal to the distance between the openings in the strip.

According to yet another aspect of the invention, a security seal in the form of a closure seal for sealing an opening in the end of a tubular member formed, in the proximity of such opening, with a pair of diametrically opposite openings, comprises a top panel and a cylindrical skirt diametrically split into two halves hinged to each other along a vertical line at the division between the two halves of the skirt. An inner protuberance on each half serves for fitment into one of the pair of openings in the tubular member, so that the closure seal may be closed by articulation around the end of the tubular member, axial movement in the closed position being prevented by the above mentioned fitment. The first and second halves comprise the said first and second parts of a sealing system according to this invention, with the cavity formed on the first half and the locking pin on the second half on their respective vertical edges opposite the vertical hinge line so that, on closing the closure seal around the end of the tubular member, the pin penetrates the cavity and seals the device.

Other types of security seals and of devices that have to be closed are also embraced by the present invention, provided that the new sealing system is used. In this respect, special attention should be given to the device for closing and sealing envelopes disclosed in Brazilian patent application PI 8903982 (and corresponding U.S. Pat. No. 4,983, 047) that could have its six or more sealing systems substituted by the new system according to the present invention.

Another seal comprising a sealing system according to the invention has the above mentioned first and second parts hinged to each other by two hinge lines separated by a portion having a dimension determining a separation between the first and second parts in the said sealed configuration. The first part is provided with an extension foldable over the cavity prior to closure of the seal and formed with an opening suitable to be penetrated by said locking pin but which is smaller than the first entry opening, such opening becoming aligned with the first entry opening when the extension is folded over the cavity.

As already mentioned, the new sealing system is intimately related to the fact that its manufacture may be facilitated by a simple moulding process that is economic and highly reliable during prolonged operation. Thus, in accordance with another aspect of this invention, a moulding system in an injection mould for manufacturing the new sealing system comprises a mould plate mounting a first fixed part and a second movable part susceptible of movement comprising at least partial rotation between a first position in which the movable part cooperates with the fixed part to define a male formation for moulding a cavity with an internal tooth usable in the new sealing system, and a second demoulding position. It further comprises an actuator means adapted to cause movement of the movable part during an opening movement of the mould to permit demoulding.

The present invention will be better understood from the following description given solely by way of example, with reference to the accompanying drawings, in which:

FIG. 1 is a perspective view of a security seal in accordance with a first preferred embodiment of the invention;

FIG. 2 is side view, partially in section, of the seal of FIG. 1, showing the sealing system according to the invention immediately before use;

FIG. 3 is a view similar to that of FIG. 1, but with the seal in the closed or sealed configuration;

FIG. 8 is a section through a plate of a mould, containing elements for moulding sealing systems according to the present invention;

FIG. 9 is a perspective view of two of the elements shown in FIG. 8;

Figure 4:
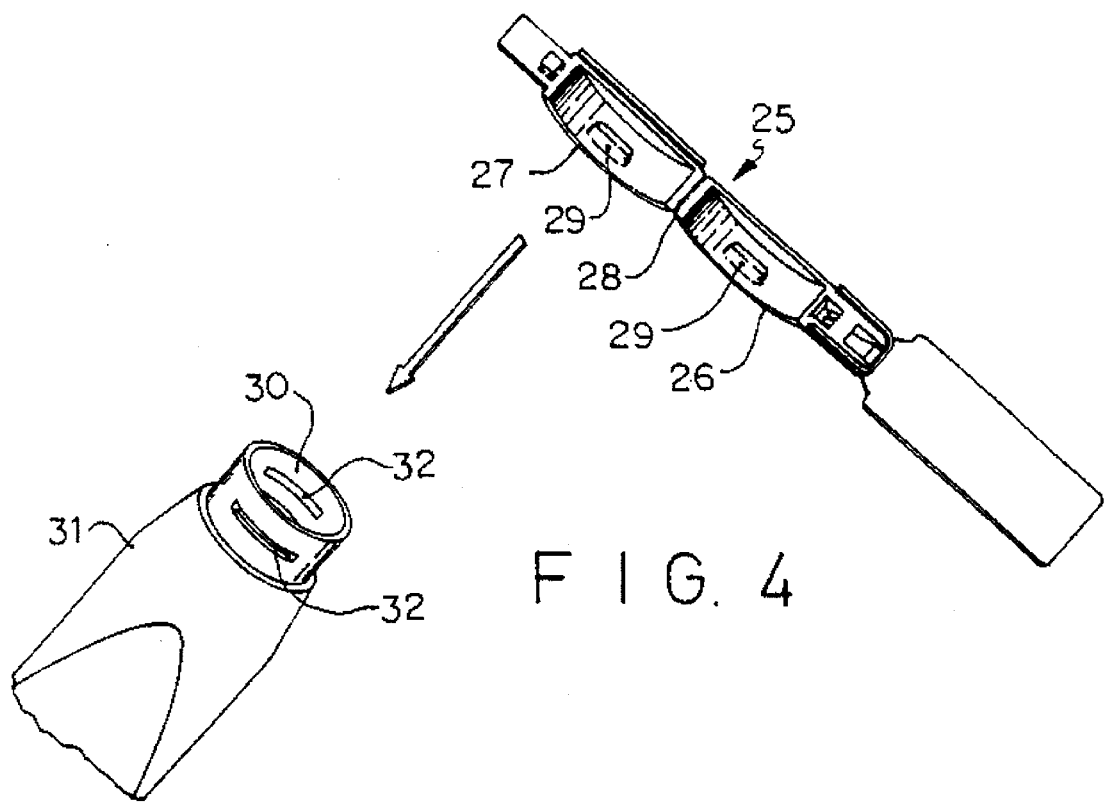
FIG. 4 is a perspective view of a security seal in accordance with a second preferred embodiment of the invention, the seal being illustrated in position for sealing the end of a tubular element.

Referring now to FIGS. 1 and 2 of the drawings, they show a new security seal using a sealing system according to a preferred embodiment of the invention. The security seal comprises a first part 1 provided with a capsule-like cavity 2 and a second part 3 integral with the first part 1 and hinged thereto about a hinge line 4 so as to be able to fold over and cover the cavity 2 in part 1.

Part 1 of the seal comprises a flat base 5, in which cavity 2 is formed, two lateral flanges or guides 6 normal to the plane of the base and parallel to the side edges of the cavity and, at one end adjacent a first end of the cavity, a lateral strip 7 interconnecting corresponding ends of flanges 6 to define a passage 8.

Adjacent the other end of cavity 2, base 5 is formed with a small rectangular protuberance 9, the function of which will be described later as will also an opening 10 cut into the end of part 3 and having one edge coinciding with hinge line 4.

Part 1 is further provided with an elongate flexible strip 11 that extends from base 5 at a position adjacent passage 8 and is formed with a series of rectangular openings 12 slightly larger than protuberance 9.

Laterally of part 1 of the seal, there is an identification tab 13.

Considering now the sealing system in more detail, cavity 2 has an entry opening 14 for receiving a locking pin 15 formed at the end of part 3 that is remote from hinge line 4. Cavity 2 also has a second opening 16 adjacent to and in the same plane as entry opening 14, it being separated from the latter by the base 17 of a locking tooth 18 that projects into the interior of cavity 2. Tooth 18 is longitudinally split to form a double tooth, the distance between its free end and the bottom of cavity 2 being substantially the same as the axial dimension of a head 19 of locking pin 15 on part 3 of the seal.

It will be observed that tooth 18 is inclined from its base 17, partially under (as shown in FIG. 2) entry opening 14 so that it presents a certain resistance to the complete insertion of the locking pin into cavity 2, after which—due to the resilience of the tooth—head 19 of pin 15 pass beyond the inner end of the tooth, a rib 20 along part of the length of pin 15 and immediately behind the head fitting into the slot defined by the longitudinal split in the tooth. In this manner, pin 15 becomes firmly caught in cavity 2 so as to exercise the locking function of the seal.

Another important aspect of the seal according to this invention resides in the formation of the inner walls of cavity 2. It is that formation, combined with the localisation of tooth 18 between the two openings 14 and 16, that greatly facilitates the manufacture of the device (as will be described later) with a cavity having an internal tooth, that is totally closed with the exception of the two openings 14 and 16. It will therefore be seen that the cavity has two side walls normal to the plane of base 5 of part 1 of the seal, interconnected by a wall 21 that, as best seen in FIGS. 2 and 3, starts from an edge 22 of opening 16 and curves underneath base 17 of tooth 18 to a point at the bottom of the cavity almost exactly below an edge 23 of opening 14. The wall then rises to edge 23.

The second part of the seal is also formed with a small protuberance 24, the distance of which from tooth 15 corresponds to the distance between the two openings 16 and 18 in part 1. Similarly, such distance also corresponds to the spacing between the openings 12 along flexible strip 11.

FIG. 2 shows the seal prepared for use with part 3 hinged slightly upwardly about hinge line 4 so that opening 10—or at least its projection—is aligned with passage 8 below below lateral strip 7 at the opposite end of part 1. The free end of flexible strip 11 is then passed through orifices or the like in the object to be sealed (not shown) after which it is introduced through passage 8, over and past openings 14 and 16 and out of the seal through opening 10. The length of the loop thus formed by strip 11 will be regulated according to necessity and, once this is determined, the nearest opening 12 will be placed over protuberance 9 in part 1 of the seal. This will automatically and precisely register the next two openings 12 with and over entry openings 14 and 16 to cavity 2.

In order to close the seal to the configuration shown in FIG. 3, part 3 is folded totally over part 1 until pin 15 penetrates entry opening 14 and the small protuberance 24 penetrates opening 16. On forcing closure of the seal, head 19 of pin 15 will deform tooth 18 slightly until it passes the inner end of the tooth with a small click, rib 20—as already mentioned—fitting into the longitudinal slot in the tooth. The seal thus assumes its sealed configuration.

FIG. 4 shows a second embodiment of this invention, in the form of a security seal 25 comprising two halves 26 and 27 of a diametrically split capsule-type cap (that is to say, having an upper panel and a pending skirt), the two halves being hinged together along a hinge line 28. The inner wall of the skirt portion of each half has a blade type protuberance 29. Seal 25 serves specifically to seal the opening 30 at the end of a tubular part 31 provided with two partially circumferential and diametrically opposite slots 32. Thus, with the closure seal 25 open in the position shown in FIG. 4, it may be placed around opening 30 and then closed so that the two protuberances fit into slots 32.

Figure 5:
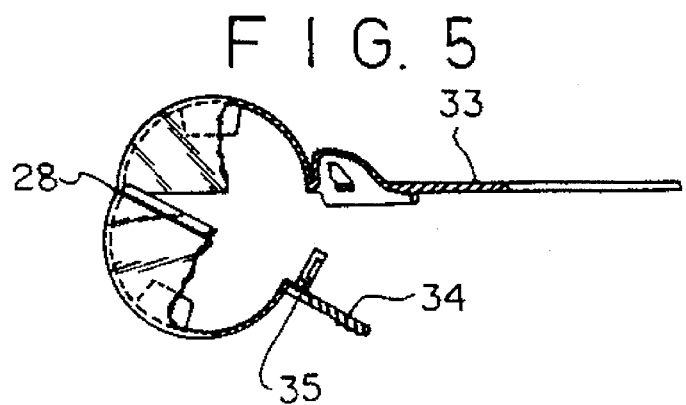
FIG. 5 is a top partially cut-away plan view of the seal of FIG. 4 during closing.
Figure 6:
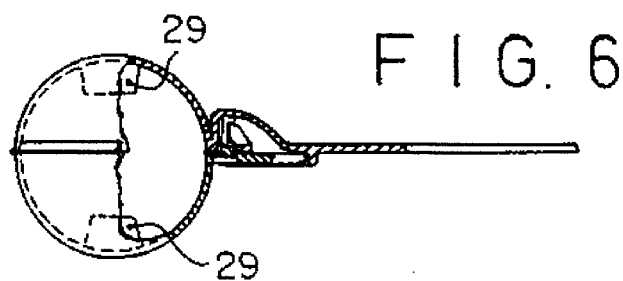
FIG. 6 is a view similar to that of FIG. 5, but with the seal in the closed or sealed configuration.

The closure seal of FIGS. 4 to 6 is also provided with a sealing system almost identical to that of the seal of FIGS. 1 to 3. Thus the same characteristics are indicated with the same reference numbers. Half 26 of the seal is provided with a lateral blade 33 formed at one end with a cavity identical to that of the first embodiment, that is to say, it has entry openings 14 and 16, the split tooth 18 with its base 17 and the curved wall 21. The remaining part of blade 33 corresponds to the identification blade or tag 13 of the seal of the first embodiment.

Half 27 of the seal is equally formed with a locking pin 15 with head 19 and a longitudinal rib 20, the only difference being that the pin is connected to a small lateral blade 34 by means of a weakened region 35.

FIG. 5 shows closure seal 25 during closure while FIG. 6 shows the seal in the closed or sealed configuration. It will be understood from the similarity to FIGS. 2 and 3 that closure of seal 25 is effected in a manner identical to that of the seal of the first embodiment described.

Figure 7:
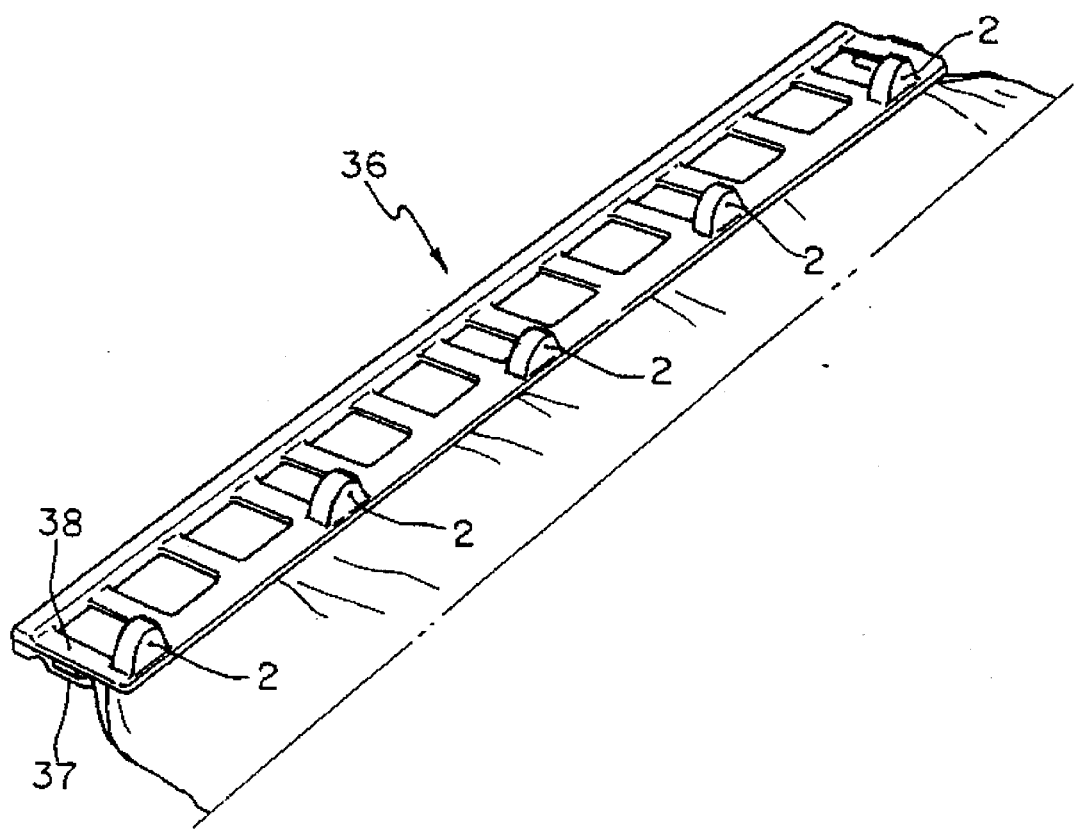
FIG. 7 is a perspective view of a device for the closure and sealing of envelopes that incorporates various sealing systems according to the present invention.

FIG. 7 shows another application of the sealing system described above, this time together with a device for closing and sealing envelopes. This device will not be described in detail since, with the exception of the sealing systems, it is identical to that described and illustrated in Brazilian patent application PI 8903982 of 08.08.89 (corresponding to U.S. Pat. No. 4,983,047) of the present applicant and which is incorporated herein by way of reference. The envelope closure device 36 shown in FIG. 7 comprises one half 37 folded over another half 38, the two halves being sealed together by six sealing systems. In the case of PI 8903982, each sealing system comprises a locking pin upstanding from the half corresponding to half 37 and intended for being received in an orifice having internal teeth in the other half. In the device of FIG. 7, each pin (not visible) in half 37 is identical to pin 15 in FIG. 1 and each orifice with its internal teeth is substituted by a capsule type cavity identical to that used in the other embodiments of this invention. Apart from ensuring a very high degree of security, manufacture of the device 36 with the new sealing systems of the present invention makes it economically more viable that that illustrated in PI 8903982.

The manufacture of a product, such as the seals and the envelope closure device shown in FIGS. 1 to 7, with sealing systems according to this invention, may be carried out using an injection mould of which one the mould plates is shown in FIG. 8 of the drawings. As will be seen, one plate 39 of the mould is formed with one or more sets of cavities (two sets are illustrated) for receiving a fixed moulding part 40 and a movable moulding part 41 for moulding a cavity with a tooth, and an actuator 42 for part 41. As best seen in FIG. 9, parts 40 and 41 are shaped to permit rotation of part 41 due to the fitment of a partially cylindrical protuberance 43 on part 41 in a partially cylindrical cavity 44 in fixed part 40.

Fixed part 40 has surfaces 45 and 46 in the same plane as the inner (upper) surface of mould plate 39, which are separated by a upwardly protruding portion 47 having one substantially vertical side and an opposite side defining a small vertical portion 48 followed by an inclined portion 49 formed with two elongate slots 50.

Movable part 41, on the other hand, has an arm 51 that leaves protuberance 43 (centre of rotation) and extends to a portion 52 that is curved upwardly and towards the fixed part 40. A planar surface 53 of portion 52 that faces inclined portion 49 of fixed part 40 is formed with two slots 54 corresponding to slots 50 so that, when part 41 is rotated anticlockwise to the position shown in FIG. 8, the flat faces 49 and 53 become superimposed with slots 50 and 54 complementing each other to define two parallel cavities.

Movable part 41 is also formed with a lower actuating lug 55 that cooperates with the opposite upper and lower surfaces of a cavity 56 in actuator 42. This latter also cooperates, by means of an inclined surface 57 at its upper end, with the lower surface of arm 51 of part 41.

Fixed part 40 is mounted on plate 39 by means of a nut received in a cavity in the lower surface of the plate, whereas movable part 41 is biased towards a mould open configuration by a pressure spring 58 (see the left side of FIG. 8). Upward shifting of actuator 42 against the force of spring 58, during closure of the mould to an injection position, rotates part 41 clockwise to close surface 53 against surface 49 of fixed part 40.

During use of a mould including plate 39, when the mould is open to effect demoulding, actuator 42 is operated to cause rotation of part 41 away from fixed part 40 during the movement of separation of the two mould plates. This permits demoulding of the cavity with a tooth having a negative surface, as defined by portions 47 and 52 of parts 40 and 41.

It will be understood immediately by any person versed in the art that the set of parts illustrated in FIGS. 8 and 9 offers a manner of moulding cavity 2 with tooth 15 as shown in the other figures of the drawings, with an automatic and very simple demould operation, notwithstanding the existence of various negative surfaces, without the necessity to use complex drawers and actuating wedges that are subject to every type of malfunction.

Figure 10:
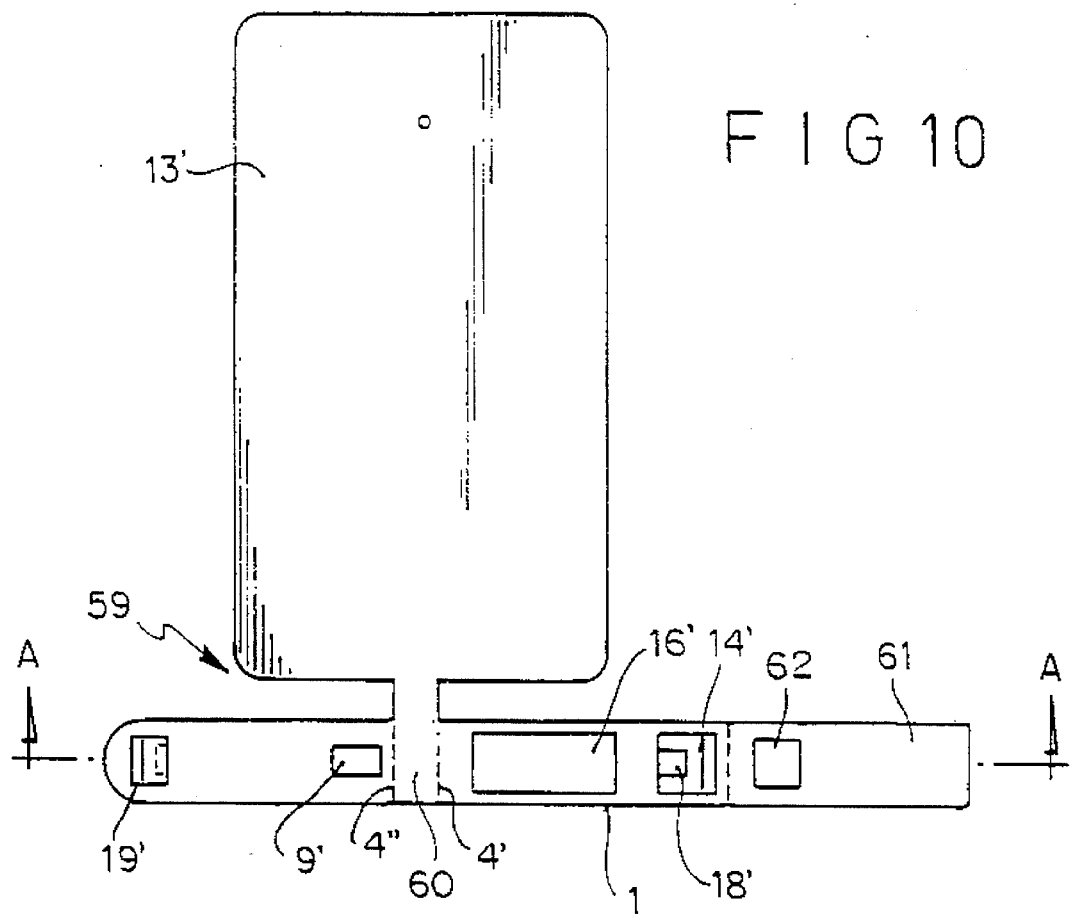
FIG. 10 is a plan view of a further preferred embodiment of a security seal provided with a sealing system according to the invention, the seal being viewed in an open position.
Figure 11:
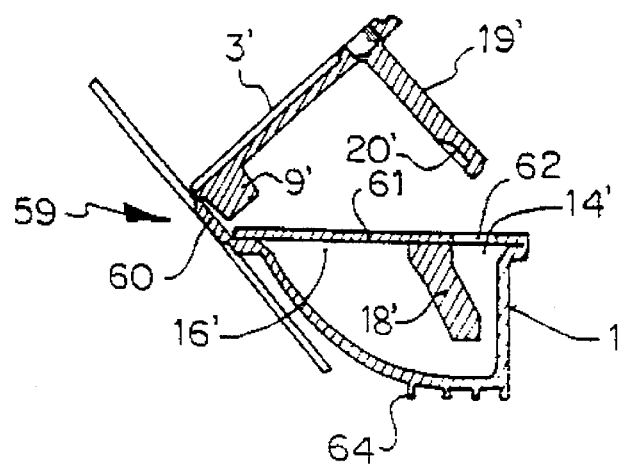
FIG. 11 is a cross sectional view along line A—A of FIG. 10, except with the seal being prepared for closure.

FIGS. 10 and 11 show yet another preferred embodiment of a security seal incorporating a sealing system according to the present invention. In this case the seal 59 differs from those of FIGS. 1 to 6 in that the two parts 1' and 3' of the seal are designed to receive therebetween a part of the device being sealed. Seal 59 serves to seal the money container of a public telephone and it is seen that the hinge line 4 of the FIG. 1 embodiment is substituted by two hinge lines 4' and 4" so that in the closed or sealed configuration a portion 60 between such lines determines the dimension of the separation between parts 1' and 3'. Moreover, a protuberance 9' (somewhat equivalent to protuberance 9 in FIG. 1) is also dimensioned to correspond substantially to such separation and, being adjacent to hinge line 4', determines that on folding part 3' over part 1' to close the seal folding occurs first about hinge line 4' and then about hinge line 4".

Identification tag 13' is attached to portion 60 of seal 59.

Another difference to be noted in the embodiment of FIGS. 10 and 11 is that tooth 18', instead of being split as in the other embodiments, is narrower that the entry opening 4', whereas locking pin 19' has the full width of opening 14' and has a recess 20'(rather than rib 20) that receives the end of the tooth 18' when the seal clicks into its sealed configuration.

Finally, in order to ensure the complete security of the seal by preventing any possibility of access to openings 14' and 16' and thus to the locking pin 19' and tooth 18', part 1' of the seal is provided with a hinged extension 61 provided with an opening 62 that, on folding extension 61 over the rest of part 1', enters into registry with opening 14' but is smaller than the latter so as only just to permit passage of the locking locking pin 19'. A non-apertured region of extension 61 will then cover opening 16' for which reason there is no necessity for seal 59 to have any protuberance corresponding to protuberance 24 of FIG. 1.

The cavity region of seal 59 is also formed with external ribs 64 so as to leave a visible sign of attempted violation should opening of the seal be attempted by squeezing the cavity from the outside with a view to liberate pin 19' from tooth 18'.

When it is desired to close seal 59 with an element of the device being closed caught between parts 1' and 3' of the seal, extension 61 is first folded over part 1' to cover the cavity region, then part 3' is folded over to imprison the element of the device being sealed between part 3' and extension 61, part 3' being pressed down so that locking pin penetrates opening 62 in the extension before passing into entry opening 14' and locking onto the end of inner tooth 18'. This can be visualised from FIG. 11.

Finally, it will be understood that the present invention has been described with respect to various specific embodiments merely by way of example, and that any modifications within the inventive concept of the invention should be considered to be within the scope thereof which should only be limited by the terms of the following claims.

I claim:

1. Sealing system for a security seal, comprising:
   (a) a first part defining a cavity having a top entry end and a closed bottom opposite said top entry end, said first part including:
      a first entry opening in said top entry end;
      a second entry opening in said top entry end;
      said cavity being closed with the exception of said first and second entry openings;
      said top entry end having a wall portion which lies between and separates said first entry opening from said second entry opening, said wall portion having an outer surface and an inner surface, said inner surface being within said cavity and facing said closed bottom;
      each of said entry openings having one edge which is at said wall portion and a remote edge which is opposite to said one edge and is spaced from said wall portion;
      a tooth integral with said inner surface of said wall portion, said tooth being directed towards said closed bottom;
      said closed bottom extending from the remote edge of said first entry opening to the remote edge of the second entry opening, said closed bottom extending under said tooth; and
   (b) a second part carrying a locking pin cooperable with said first part, said second part being movable from an unlocked position to a locking position where it covers said second entry opening and said locking pin penetrates said first entry opening and is lockingly engaged by said tooth.

2. Sealing system according to claim 1 in a security seal for sealing an opening in the end of a tubular member, said tubular member having a pair of diametrically opposite apertures in the proximity of said opening, said seal comprising:
   a top panel and a cylindrical skirt depending from said top panel, said top panel and said cylindrical skirt being split in half so that a first half of said cylindrical skirt is integral with a first half of said top panel, and a second half of said cylindrical skirt is integral with a second half of said top panel, said first and second halves of said skirt having a first pair of corresponding edges and an opposite second pair of corresponding edges, said first and second halves of said skirt being respectively on said first and second parts of said sealing system;
   a hinge line connecting said first and second halves of said skirt along said first pair of corresponding edges;
   an inner protuberance formed on each said first and second half of said skirt, each said protuberance being adapted for fitment into a corresponding one of said diametrically opposite apertures in said tubular member;
   said cavity being formed on said first half of said skirt and said locking pin being formed on said second half of said skirt at respective edges of said opposite second pair of corresponding edges, whereby, in use and on closing said seal around the end of said tubular member, said pin penetrates said cavity and said seal assumes a sealed configuration.

3. Sealing system for a security seal, comprising:
   (a) a first part having a top entry end and a closed bottom which define a cavity, said first part including:
      a first entry opening in said top entry end providing access into said cavity, said first entry opening facing downwardly toward said closed bottom;
      a second entry opening in said top entry end providing access into said cavity, said second entry opening facing downwardly toward said closed bottom;
      a wall portion which lies between said entry openings and separates said first entry opening from said second entry opening;
      a tooth which is integral with said wall portion and extends from said wall portion into said cavity toward said closed bottom of the first part;
      each of said entry openings having one edge which is at said wall portion and a remote edge which is opposite to said one edge and is spaced from said wall portion;
      said closed bottom extending from the remote edge of the first entry opening, under the tooth, and to the remote edge of the second entry opening;
   (b) a second part which includes a locking pin which is lockingly engageable with said tooth, said second part being movable to a locked position at which:
      the locking pin extends through said first entry opening and is in locking engagement with said tooth, and
      the second entry opening is covered by said second part to obstruct access into said cavity.

4. Sealing system according to claim 1, wherein said tooth is formed with a longitudinal slot and said locking pin has a longitudinal rib that fits into said slot in said sealed configuration.

5. Security seal comprising a sealing system according to claim 1, an elongate flexible strip extending from said first part and formed along its length with a series of openings axially spaced from each other, and hinge means joining said second part to said first part to permit said second part to be folded over said first part to present the locking pin to said first entry opening to said cavity, each of said openings in said strip being dimensioned to permit passage therethrough of said locking pin.

6. Security seal according to claim 4, comprising guide means in said first part for the passage of the free end of said strip.

7. Security seal according to claim 4, wherein said first part is formed with a protuberance adjacent one of said first and second entry openings, said protuberance being dimensioned to penetrate one of said series of openings in said strip and being spaced from said first entry opening by a distance equal to the distance between the openings of said series.

8. Security seal comprising a sealing system according to claim 1, in which said first and second parts are hinged to each other by means of two hinge lines separated by a portion having a dimension determining a separation between said first and second parts in the said sealed configuration, said first part being provided with an extension foldable over said cavity prior to closure of the seal, said extension being formed with an opening suitable to be penetrated by said locking pin but smaller than said first entry opening, which enters into registry with said first entry opening when said extension is folded over said cavity.

* * * * *

UNITED STATES PATENT AND TRADEMARK OFFICE
CERTIFICATE OF CORRECTION

PATENT NO.  : 5,542,724
DATED       : August 6, 1996
INVENTOR(S) : Eduardo de Lima CastroNetto It is certified that error appears in the above-indentified patent and that said Letters Patent is hereby corrected as shown below:

Title page, under item [19], "Netto" should read --de Lima Castro Netto--

On the title page, item [75], the inventor's name should read:

--Eduardo de Lima Castro Netto--

Signed and Sealed this

Eighteenth Day of February, 1997

Attest:

BRUCE LEHMAN

*Attesting Officer*  *Commissioner of Patents and Trademarks*